No. 628,495. Patented July 11, 1899.
J. SKINNER.
POTATO DIGGER.
(Application filed Apr. 3, 1899.)
(No Model.) 2 Sheets—Sheet 1.
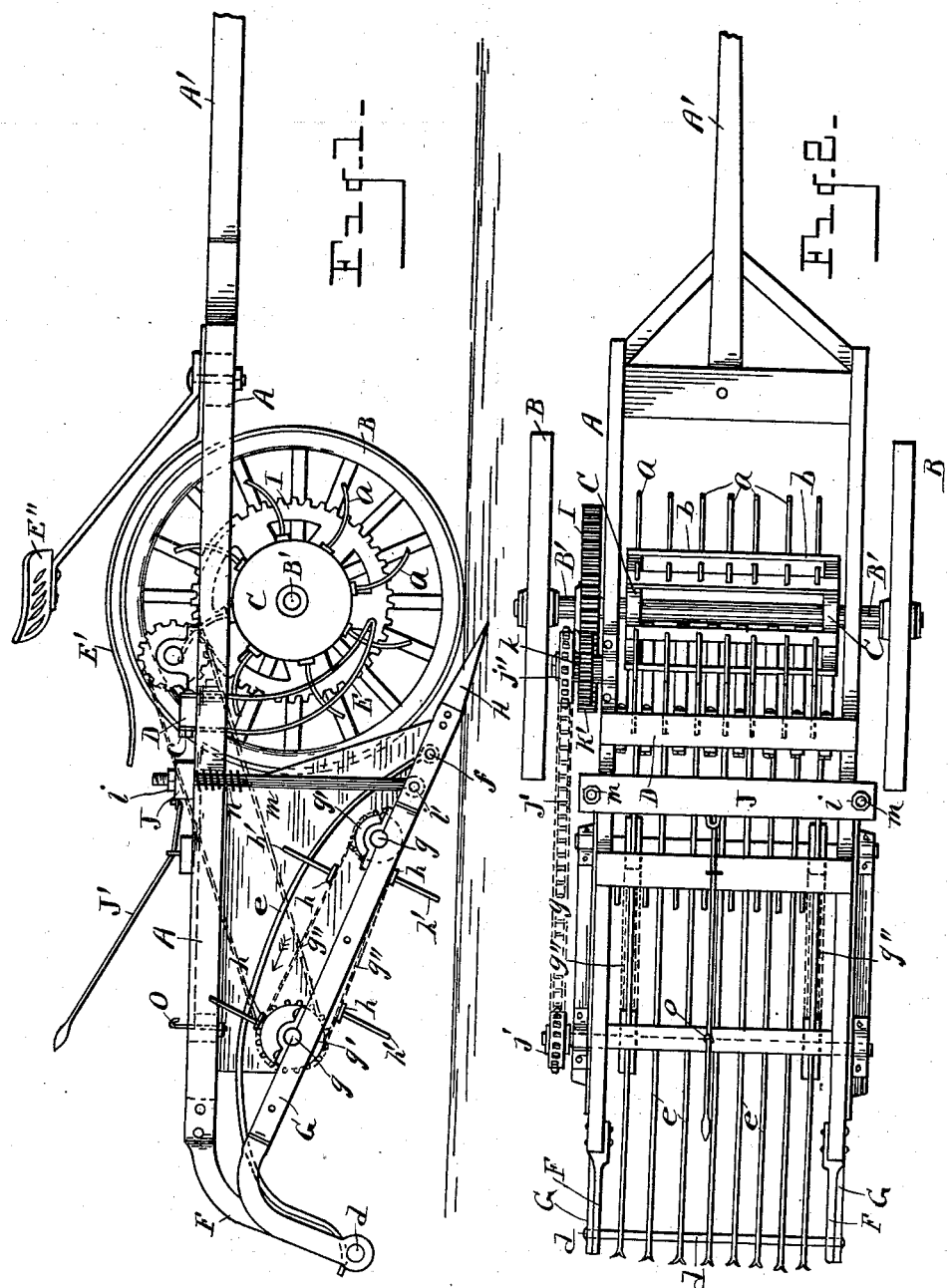
WITNESSES.
INVENTOR.
Attorneys.

No. 628,495. Patented July 11, 1899.
J. SKINNER.
POTATO DIGGER.
(Application filed Apr. 3, 1899.)
(No Model.) 2 Sheets—Sheet 2.
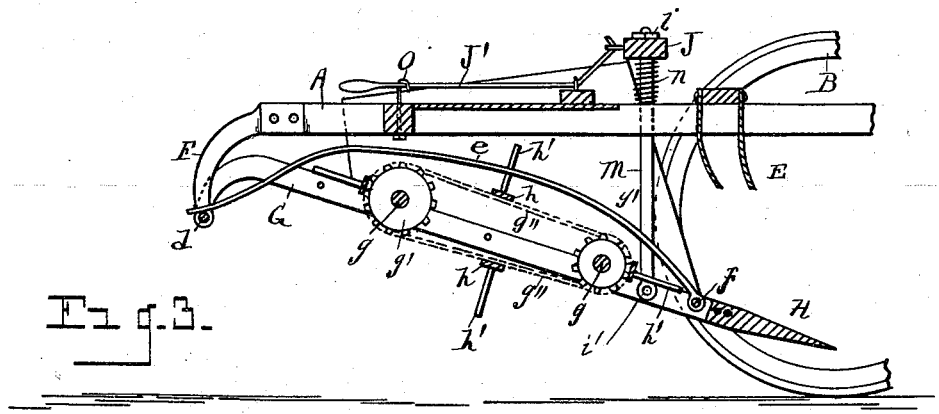
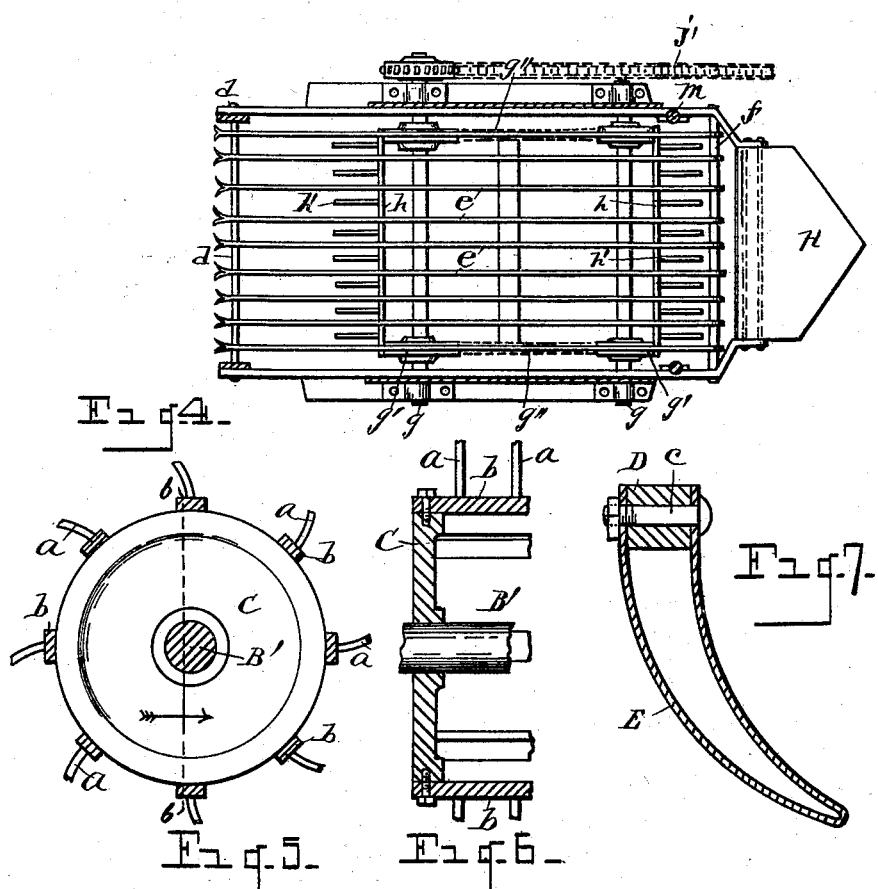
WITNESSES. INVENTOR.
John Skinner
Attorneys.

UNITED STATES PATENT OFFICE.

JOHN SKINNER, OF DAVISON, MICHIGAN, ASSIGNOR OF ONE-THIRD TO RIVINGSTON ASHLEY, OF SAME PLACE.

POTATO-DIGGER.

SPECIFICATION forming part of Letters Patent No. 628,495, dated July 11, 1899.

Application filed April 3, 1899. Serial No. 711,512. (No model.)

*To all whom it may concern:*

Be it known that I, JOHN SKINNER, a citizen of the United States, residing at Davison, in the county of Genesee, State of Michigan, have invented certain new and useful Improvements in Potato-Diggers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in potato-diggers; and it consists in the construction and arrangement of parts hereinafter fully set forth, and pointed out particularly in the claims.

The objects of the invention are to produce a potato-digger in which the arrangement is such as to enable the potatoes to be cleanly and perfectly dug, to provide for a removal of the vines in a manner to prevent the clogging of the machine and insure the deposit of said vines and potatoes upon the ground in the rear of the machine, to provide for adjusting the shovel so as to enable the depth at which the shovel enters the ground to be perfectly regulated, and to provide certain movable parts in a manner to obviate the clogging and possible breaking of the machine. These objects are attained by the mechanism illustrated in the accompanying drawings, in which—

Figure 1 is a side elevation of a potato-digger involving my improved features, one of the side transporting-wheels being removed. Fig. 2 is a plan view of the machine. Fig. 3 is a detail in transverse section showing manner of raising the shovel free from the ground. Fig. 4 is a plan view of the lower pivoted frame of the machine carrying the shovel, the pivoted bars, and the endless chain carrying the conveying-fingers adapted to move the vines and potatoes rearwardly and discharge them at the tail of the machine. Fig. 5 is an enlarged detail in section of one of the heads of the main cylinder. Fig. 6 is a vertical section as on line 6 6 of Fig. 5. Fig. 7 is an enlarged longitudinal section through one of the curved guard-teeth which prevent an accumulation of vines and weeds on the arms of the cylinder.

Referring to the letters of reference, A designates the main frame of the machine, to which the tongue A' is attached in any suitable manner. The frame A is adapted to carry the transporting-wheels B, which are secured upon the transverse axle B', which crosses the frame of the machine. Secured upon said axle between the bars of the frame is a cylinder, whose heads C are connected by the cross-bars b, which extend from one to the other and are secured at their ends to said heads in the manner shown in Fig. 6. Mounted in said cross-bars are the arms a, which are curved in a direction opposite to that in which the cylinder rotates and are adapted to project downwardly, so as to engage the vines of the potatoes.

Crossing the frame of the machine in the rear of the cylinder is a cross-bar D, to which is secured a series of curved accuminated fingers E, formed by folding a strip of metal upon itself and securing its opposite ends to the opposed faces of the cross-bar D by means of the bolts c. Said fingers lie between the arms a of said cylinder, and the lower ends of said fingers are curved concentrically with said cylinder, so as to lie adjacent thereto and serve to prevent any accumulation of vines upon or entanglement of weeds and vines between the arms of said cylinder.

E' represents a curved metallic housing, which extends over said cylinder as a guard therefor. Mounted upon the frame in any suitable manner is a seat E" for the operator. Curving downwardly from the rear end of the frame on each side are the brackets F, and pivoted at d to the lower ends of said brackets are the rear ends of the side bars G of the lower frame, which extends forwardly and downwardly and carries at its lower end the shovel H of suitable shape and adapted to enter the ground under a row of potatoes and bring them to the surface.

A series of upwardly-curved bars e extend longitudinally of the lower frame, their forward ends being pivoted to a cross-rod f and their rear ends resting upon the rear cross-rod, which serves to pivotally unite the rear ends of the upper and lower frames. These curved bars *e* are placed a suitable distance apart and serve as a riddle upon which to separate the dirt from the potatoes which are carried thereover.

Journaled in the lower frame are the shafts *g*, which cross said frame transversely near the opposite ends thereof and which are provided at their opposite ends with sprocket-wheels *g'*, over which pass the endless sprocket-chains *g''*. Crossing transversely between said chains and secured to the outer faces thereof are the bars *h*, in each of which is located a row of pins *h'*. These pins extend at right angles to said chain and are adapted to pass between the bars *e* of the riddle, their movement being in the direction indicated by the arrow. Movement is imparted to the chains carrying said pins through a sprocket-wheel *j* on one of the shafts *g*, over which passes a sprocket-chain *j'*, which leads from a sprocket-wheel *j''* on a stub-shaft *k*, upon which is a pinion *k'*, meshing with a large driving-gear I on the main axle B'. It will therefore be seen that a rotation of the main axle through the medium of the transporting-wheels will drive the intermediate gears and sprocket-wheels to cause the sprocket-chain *g''*, carrying the projecting pins, to move in the direction indicated.

In the operation of this device it will be understood that the transporting-wheels are placed astride of a row of potatoes, with the shovel so set as to enter under the potatoes in the row and bring them to the surface as the machine is drawn along. At the same time the rotation of the drum carrying the curved arms *a* will cause said arms to engage the potato-vines and sweep them rearwardly onto the lower frame, while the dirt and potatoes raised by the shovel slide upwardly onto the shovel and are deposited on the bars *e*, forming the riddle, when the pins *h'* in their movement engage the dirt and potatoes on the riddle, carrying them rearwardly over said bars, which operation sifts the dirt through said bars and discharges the potatoes over the tail of the machine onto the ground, where they are in position to be readily picked up. In this operation the curved fingers E prevent at all times the accumulation of vines or weeds upon the arms *a*, so as to prevent any possible accumulation upon the drum and keeping the machine always clear and in proper working order.

The pivoting of the riddle-bars *e* at their forward ends enables said bars to rise should the pins *h'* in their movement force any obstructing matter upwardly between them, thereby preventing the clogging of the machine and the possible breaking of some of its parts.

To provide for raising the shovel out of the ground when required, a vertically-movable cross-head J is employed, which extends transversely of the machine and through which pass the rods *m*, having the nuts *i* on their upper ends, the lower ends of said rods being pivoted at *i'* to the bars of the lower frame. Attached to said cross-head J is an angle-lever J', which is pivoted on the frame and which is adapted to raise said cross-head when its free end is depressed, thereby elevating the forward end of said lower frame and raising the shovel free from the ground, as clearly shown in Fig. 3, said parts being maintained in said position by engaging said lever under the hook *o*. This arrangement enables the machine to be transported from place to place with the shovel sufficiently elevated to clear the ground or any obstruction.

For the purpose of regulating the depth at which the shovel shall enter the ground coiled springs *n* are employed upon the rods *m*, the lower ends of which are secured to said rods, while the upper ends of said springs abut against the under face of the cross-head J. This arrangement enables the depth at which the shovel shall enter the ground to be regulated by the adjustment of said nuts, as will be well understood.

Having thus fully set forth this invention, what is claimed is—

1. In a potato-digger, the combination with the transporting-wheels, the cylinder mounted on the axle of said wheels, said cylinder having the arms projecting therefrom, the teeth on the frame of the machine curving downwardly between the arms of said cylinder and standing adjacent to the periphery thereof.

2. In a potato-digger, the combination of the main frame, the transporting-wheels carrying said frame, the rotary cylinder in the main frame having the curved arms the lower frame pivoted at its rear end to the rear of the main frame and standing obliquely thereto, the shovel on the lower end of said lower frame, the bars extending longitudinally of said lower frame, and pivoted thereto at their forward ends, the rear ends of said bars being free to rise and fall, the traveling conveyer-pins carried by the lower frame adapted to pass between said bars, and means for driving said conveyer-pins.

3. In a potato-digger, the combination with the transporting-wheels and the main frame, of the rotary cylinder having the curved arms, the curved teeth depending between the arms of said cylinder, the lower frame pivoted to the rear of the main frame and extending downwardly and forwardly, the shovel at the lower end of said pivoted frame, a series of pivoted bars extending longitudinally of said lower frame, a series of pins mounted on endless chains adapted to pass between said bars, and means connected with the axle of the transporting-wheel for driving the chains carrying said conveyer-pins.

4. In a potato-digger, the combination with the main frame, the lower frame pivoted thereto and extending thereunder, a shovel at the forward end of said lower frame, curved bars extending longitudinally of said lower frame and pivoted thereto at their forward ends, a movable cross-head carried by the main frame, vertical rods adjustably mounted in said cross-head at their upper ends and pivoted at their lower ends to said lower frame, and a lever for raising said cross-head.

5. In a potato-digger, the combination with the main frame, the lower frame pivotally mounted under the main frame having the shovel attached to the forward end thereof, a cross-head carried by the main frame, rods whose upper ends pass freely through said cross-heads and whose lower ends are pivoted to said lower frame, and the springs mounted on said rods and bearing against the lower face of said cross-head.

In testimony whereof I sign this specification in the presence of two witnesses.

JOHN SKINNER.

Witnesses:
C. C. ELMORE,
ALBERT E. HURD, Jr.